US012610930B2

(12) United States Patent
Chen et al.

(10) Patent No.: US 12,610,930 B2
(45) Date of Patent: Apr. 28, 2026

(54) CENTRIFUGAL BRAKE MECHANISM, BAIT-CASTING REEL AND FISHING TACKLE

(71) Applicant: Shenzhen Bosaidong Technology Co., Ltd., Shenzhen (CN)

(72) Inventors: Hong Chen, Shenzhen (CN); Tianshi Cui, Shenzhen (CN)

(73) Assignee: Shenzhen Bosaidong Technology Co., Ltd., Shenzhen (CN)

( * ) Notice: Subject to any disclaimer, the term of this patent is extended or adjusted under 35 U.S.C. 154(b) by 96 days.

(21) Appl. No.: 18/663,013

(22) Filed: May 13, 2024

(65) Prior Publication Data

US 2025/0248383 A1     Aug. 7, 2025

(30) Foreign Application Priority Data

Feb. 1, 2024    (CN) .......................... 202410154219.0

(51) Int. Cl.
*A01K 89/01*          (2006.01)
*A01K 89/033*         (2006.01)

(52) U.S. Cl.
CPC ................................. *A01K 89/056* (2015.05)

(58) Field of Classification Search
CPC ........................ A01K 89/01557; A01K 89/056
See application file for complete search history.

(56) References Cited

U.S. PATENT DOCUMENTS

| | | | | | |
|---|---|---|---|---|---|
| 2,290,662 | A | * | 7/1942 | Willison | A01K 89/0155 242/289 |
| 2,896,912 | A | * | 7/1959 | Faugier | A62B 35/0093 188/185 |
| 2,967,676 | A | * | 1/1961 | Klingberg | A01K 89/033 254/26 R |
| 4,390,140 | A | * | 6/1983 | Karlsson | A01K 89/0155 242/312 |
| 5,865,387 | A | * | 2/1999 | Hirano | A01K 89/0155 188/185 |
| 6,126,105 | A | * | 10/2000 | Yamaguchi | A01K 89/01555 188/164 |
| 9,282,731 | B2 | * | 3/2016 | Niitsuma | A01K 89/0155 |

(Continued)

FOREIGN PATENT DOCUMENTS

| | | | | | |
|---|---|---|---|---|---|
| GB | 809014 | A | * | 2/1959 | ....... A01K 89/01557 |
| JP | H11266758 | A | * | 10/1999 | |
| KR | 20000076723 | A | * | 12/2000 | ....... A01K 89/01557 |

*Primary Examiner* — Emmanuel M Marcelo

(57) ABSTRACT

The present invention discloses a centrifugal brake mechanism, including a wire reel; a brake ring assembly, arranged on one side of the wire reel; and a centrifugal brake assembly, including a centrifugal seat connected to the wire reel and at least two centrifugal arms, wherein the centrifugal arm is rotatably connected to the centrifugal seat and is capable of swinging vertically relative to the centrifugal seat; and at least one centrifugal bean having a polygonal cross-section is also rotatably connected to the centrifugal arm, so that a swing angle of the centrifugal arm relative to the centrifugal seat is automatically adjusted according to the rotation speed of the wire reel, thereby adjusting a contact area between the centrifugal bean and the brake ring assembly, and then the rotation speed of the wire reel may be automatically fine-tuned to maintain a dynamic balance with the brake forces.

20 Claims, 11 Drawing Sheets

1

(56) References Cited

U.S. PATENT DOCUMENTS

| 9,433,197 | B2 * | 9/2016 | Hyun | A01K 89/01555 |
| 2017/0142949 | A1 * | 5/2017 | Sim | A01K 89/01557 |
| 2021/0329897 | A1 * | 10/2021 | Chen | A01K 89/033 |

* cited by examiner

30

1

1

100

CENTRIFUGAL BRAKE MECHANISM, BAIT-CASTING REEL AND FISHING TACKLE

CROSS REFERENCES TO RELATED APPLICATION

The present application claims the benefit of Chinese Patent Application No. 202410154219.0 filed on Feb. 1, 2024, the contents of which are incorporated herein by reference in their entirety.

TECHNICAL FIELD

The present invention relates to the field of fishing tackles, in particular to a centrifugal brake mechanism, a bait-casting reel and a fishing tackle.

BACKGROUND ART

At present, a braking system in a centrifugal brake bait-casting reel generally adopts a traditional structure of "one-sided friction of centrifugal arm and brake ring". Then, in a casting process of the bait-casting reel, a wire reel will rotate at a high speed due to tugging of a fast-flying bait; and at this time, a centrifugal arm located at one end of the wire reel is thrown out radially. After the centrifugal arm is thrown out, it interferes and rubs with an outer plane of a brake ring or an inner wall surface of the brake ring to produce a friction resistance opposite to a movement direction of the wire reel, commonly known as a brake force, so as to avoid a phenomenon of wire entangling caused by a rotation speed of the wire reel greatly exceeding a flight speed of the bait due to too fast acceleration, thereby achieving an effect of buffering the rotation speed of the wire reel. However, the existing centrifugal braking structure can only achieve a constant brake force in a casting process. That is, when a user adjusts a centrifugal brake knob to a certain gear, only a centrifugal force and a radial displacement of the centrifugal arm can affect a change in resistance between the centrifugal arm and the brake ring. However, for the same bait-casting reel, in the case of different throwing technologies, throwing strengths and weights of bait used by users, the centrifugal force and the radial displacement of the centrifugal arm are different, resulting in the difference in resistance between the centrifugal arm and the brake ring. A direct result of such difference generally leads to the occurrence of wire entangling, especially for beginners.

SUMMARY OF THE INVENTION

The technical problem to be solved by the present invention is to provide a centrifugal brake mechanism that may adjust an amplitude of a brake force automatically according to a rotation speed of a wire reel during the rotation of the wire reel, a bait-casting reel and a fishing tackle.

In order to solve the above technical problem, according to an aspect of the present invention, a centrifugal brake mechanism is provided. The centrifugal brake mechanism includes:

a wire reel;

a brake ring assembly, arranged on one side of the wire reel; and a centrifugal brake assembly, including a centrifugal seat connected to the wire reel and at least two centrifugal arms, wherein the centrifugal arm is rotatably connected to the centrifugal seat and is capable of swinging vertically relative to the centrifugal seat; and at least one centrifugal bean having a polygonal cross-section is also rotatably connected to the centrifugal arm, so that a swing angle of the centrifugal arm relative to the centrifugal seat is automatically adjusted according to the rotation speed of the wire reel, thereby adjusting a contact area between the centrifugal bean and the brake ring assembly.

A further technical solution is as follows: each centrifugal arm is provided with a first centrifugal bean and a second centrifugal bean, one end of the centrifugal arm is rotatably connected to the centrifugal seat, the first centrifugal bean and the second centrifugal bean are rotatably connected to the other end and the middle part of the centrifugal arm respectively through a first rotating shaft and a second rotating shaft, and an axis of the second rotating shaft is higher than an axis of the first rotating shaft, so that in the process of automatically adjusting the swing angle of the centrifugal arm relative to the centrifugal seat, the first centrifugal bean and the second centrifugal bean may be respectively in contact with an outer plane and an inner wall surface of the brake ring assembly.

A further technical solution is as follows: the brake ring assembly includes a brake ring; the brake ring includes a circular ring and a secondary brake ring that extends obliquely upward from an inner ring surface of the circular ring; the centrifugal arm includes an arc-shaped plate, an accommodating groove is formed in the middle of the arc-shaped plate, and one end and the middle part of the arc-shaped plate extend upward respectively to form an arc-shaped part for the first rotating shaft and the second rotating shaft to pass through; and the first centrifugal bean and the second centrifugal bean respectively sleeve the first rotating shaft and the second rotating shaft, are located in the accommodating groove, and may rotate around the first rotating shaft and the second rotating shaft respectively to automatically adjust a contact area between the first centrifugal bean and an outer ring surface of the circular ring and a contact area between the second centrifugal bean and an inner wall surface of the secondary brake ring when the wire reel rotates.

A further technical solution is as follows: the brake ring assembly further includes a brake ring seat; the brake ring is arranged on the brake ring seat; the centrifugal brake mechanism further includes a gear adjusting assembly; the gear adjusting assembly includes an adjusting knob, and a connector that is located below the adjusting knob and is connected to the adjusting knob; the brake ring seat is located between the connector and the wire reel; and the brake ring seat is movably connected to the connector through at least one elastic member so as to move in a direction close to the wire reel as the adjusting knob acts, such that the first centrifugal bean and the second centrifugal bean may be sequentially in contact with the outer ring surface of the circular ring and the inner wall surface of the secondary brake ring, respectively.

A further technical solution is as follows: the centrifugal seat is provided with at least two sliding grooves, a connecting shaft is arranged in each sliding groove, each centrifugal arm is located in one corresponding sliding groove, and an end of this centrifugal arm is hooked on the connecting shaft, and may rotate around the connecting shaft and swing vertically relative to the centrifugal seat.

A further technical solution is as follows: the centrifugal seat further includes at least one locking rod; one locking rod is arranged in each sliding groove; one end of the locking rod is connected to a side wall of the sliding groove, and the other end of the locking rod is close to the centrifugal arm; and a fixing groove is formed in a position on the centrifugal arm corresponding to the locking rod, so that the fixing groove of the centrifugal arm cooperates with the locking rod under an external force to lock the centrifugal arm.

A further technical solution is as follows: the centrifugal brake assembly further includes a reset spring plate; the reset spring plate includes a bottom plate and at least two metal spring plates that extend upward from an edge of the bottom plate; the bottom plate is located in the centrifugal seat; and each metal spring plate penetrates into the corresponding sliding groove and abuts against the centrifugal arm that is located on the inner side of the connecting shaft.

A further technical solution is as follows: the number of the centrifugal arms and the number of the sliding grooves are both four; the four sliding grooves are formed in the centrifugal seat around a circle center of the centrifugal seat, the four centrifugal arms are respectively hooked on connecting shafts of the four sliding grooves, and each of the four connecting shafts is provided with an arc-shaped groove formed therein; and a limiting part that cooperates with the arc-shaped groove is correspondingly arranged on each of the four centrifugal arms, so as to limit a rotation angle of the centrifugal arm, wherein a radian of the arc-shaped grooves in the two opposite connecting shafts is greater than a radian of the arc-shaped grooves in the other two opposite connecting shafts.

A further technical solution is as follows: a cross-section of each centrifugal bean is hexagonal, pentagonal, cross-shaped, quadrilateral, polygonal rhomboidal or polygonal quincuncial.

A further technical solution is as follows: the centrifugal brake mechanism further includes a side cover assembly; the brake ring assembly is arranged in the side cover assembly; and a rotating shaft of the wire reel penetrates into the brake ring assembly and is placed in the side cover assembly.

In order to solve the above technical problem, according to another aspect of the present invention, a bait-casting reel is provided. The bait-casting reel includes a fishing reel main body and a centrifugal brake mechanism connected to the fishing reel main body, and the centrifugal brake mechanism is the above centrifugal brake mechanism.

In order to solve the above technical problem, according to an aspect of the present invention, a fishing tackle is further provided. The fishing tackle includes the above bait-casting reel.

Compared with the prior art, in the centrifugal brake assembly of the present invention, the centrifugal arm is rotatably connected to the centrifugal seat and is capable of swinging vertically relative to the centrifugal seat, and at least one centrifugal bean with a polygonal cross-section is also rotatably connected to the centrifugal arm; and the centrifugal seat is also connected to the wire reel. When the wire reel rotates, the centrifugal arm swings under a centrifugal force, so that the centrifugal bean is in contact with the brake ring assembly. In the contact process, because the centrifugal bean is rotatably connected to the centrifugal arm, and the centrifugal bean is polygonal, a vertex angle line of the centrifugal bean will be first in contact with the brake ring assembly, and interference occurs, which is line-plane interference at this time. Later, when the swing angle of the centrifugal arm increases with the acceleration of the rotation speed of the wire reel, the centrifugal bean will be automatically adjusted to a plane (that is, a plane composed of adjacent vertex angle lines) to interfere with the brake ring assembly to generate a maximum friction resistance, that is, a maximum brake buffer force, which is plane-plane interference at this time. On the contrary, when the rotation speed of the wire reel is slowly decreasing, the swing angle of the centrifugal arm will decrease progressively with the progressive decrease of the centrifugal force, and the interference between the centrifugal bean and the brake ring assembly will be automatically adjusted from "plane-plane interference" to "line-plane interference", and finally is completely detached from interference, that is, the brake buffer force will gradually weaken until it reaches zero. It can be seen that the centrifugal bean in the centrifugal brake mechanism of the present invention may automatically adjust the contact area with the brake ring assembly along with a swing amplitude of the centrifugal arm, so as to provide brake forces of different amplitudes and achieve a purpose of automatically adjusting the brake forces. Therefore, the rotation speed of the wire reel may be automatically fine-tuned to maintain a dynamic balance with the brake forces, so as to reduce the probability of wire entangling, thereby making the whole braking effect better and more stable.

DETAILED DESCRIPTION OF THE INVENTION

Figure 1:
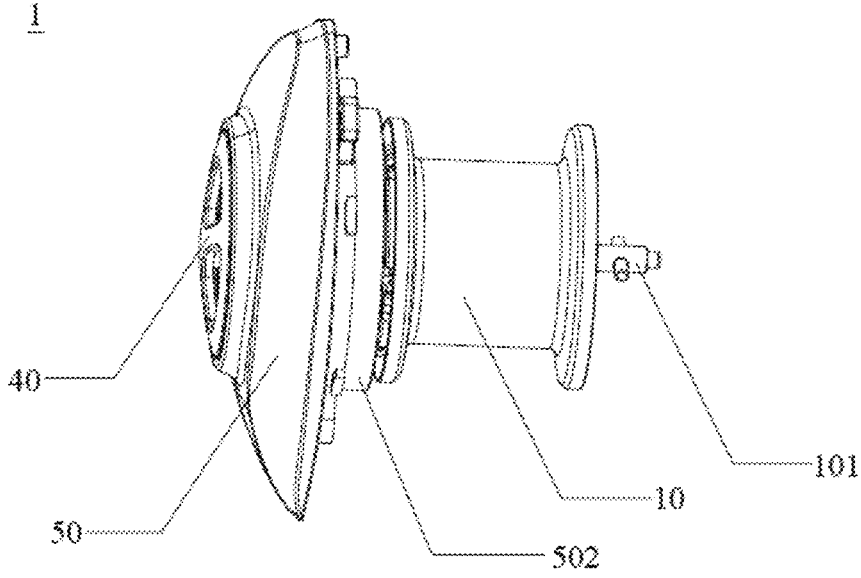
FIG. 1 is a schematic diagram of a stereoscopic structure of a first embodiment of a centrifugal brake mechanism of the present invention.
Figure 2:
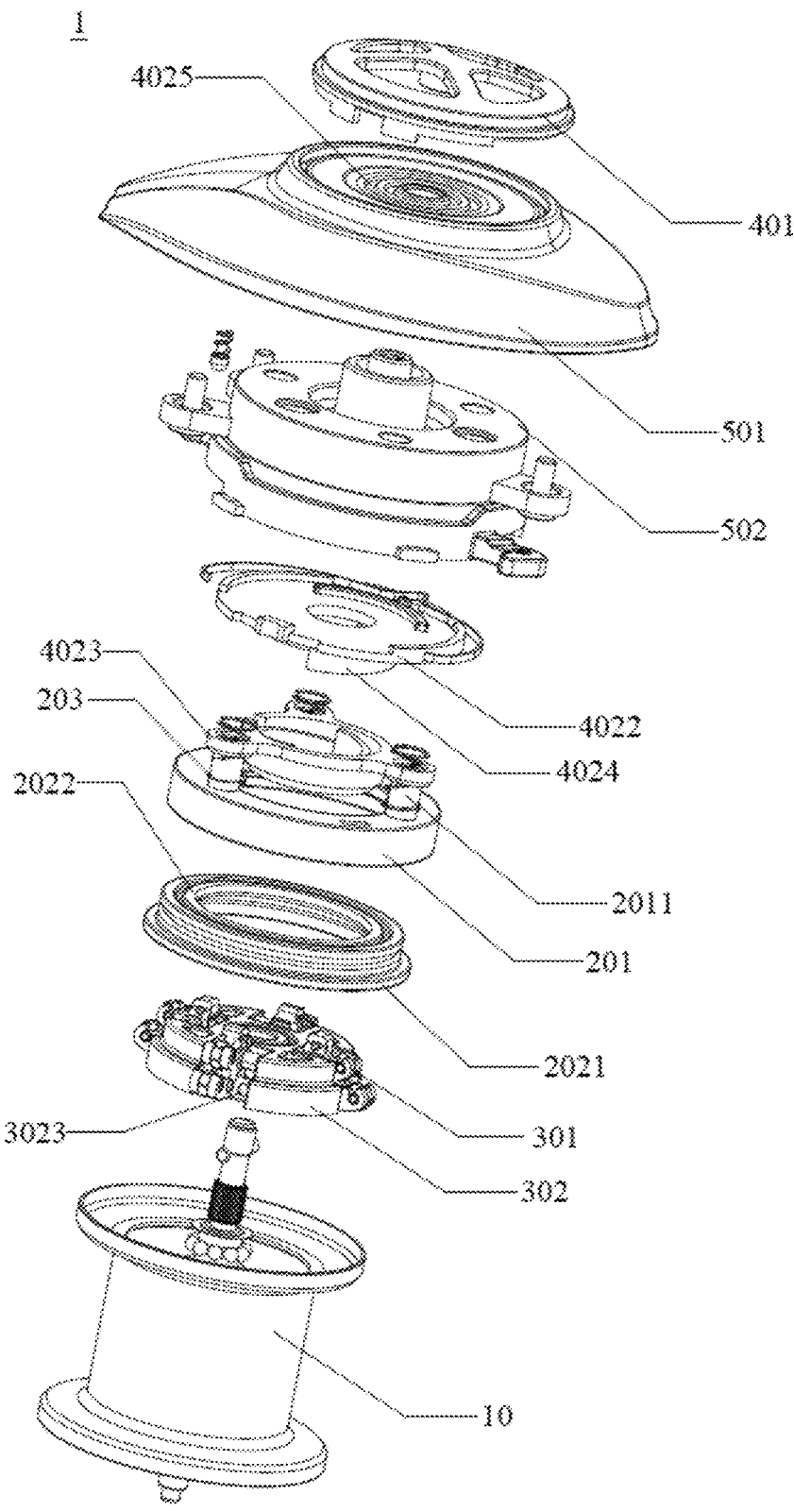
FIG. 2 is a schematic diagram of an exploded structure of the first embodiment of the centrifugal brake mechanism of the present invention.

In order to make a person of ordinary skill in the art better understand the objects, the technical solutions and the advantages of the present invention, the present invention will be further described below in conjunction with the accompanying drawings and embodiments.

Referring to FIG. 1 to FIG. 8, FIGS. 1 to 8 illustrate a first embodiment of a centrifugal brake mechanism 1 of the present invention. In this embodiment shown in the accompanying drawings, the centrifugal brake mechanism 1 includes a wire reel 10, a brake ring assembly 20 and a centrifugal brake assembly 30. The brake ring assembly 20 is arranged on one side of the wire reel 10. The centrifugal brake assembly 30 includes a centrifugal seat 302 and at least two centrifugal arms 301, wherein the centrifugal seat 302 is connected to the wire reel 10, and the centrifugal arm 301 is rotatably connected to the centrifugal seat 302 and is capable of swinging vertically relative to the centrifugal seat 302. At least one centrifugal bean having a hexagonal cross-section is also rotatably connected to the centrifugal arm 301, so that a swing angle of the centrifugal arm 301 relative to the centrifugal seat 302 is automatically adjusted according to a rotation speed of the wire reel 10, thereby adjusting a contact area between the centrifugal bean and the brake ring assembly 20. Based on the above design, according to the present invention, when the wire reel 10 rotates, the centrifugal arm 301 is capable of swinging according to the rotation speed of the wire reel 10, thereby automatically adjusting the contact area between the centrifugal bean and the brake ring assembly 20. That is, in the casting process, the wire reel 10 rotates at a lower rotation speed and a smaller centrifugal force while beginning to rotate, and then the centrifugal arm 301 has a smaller swing angle. In this process, a vertex angle line of the hexagonal centrifugal bean may be first in contact with a plane of the brake ring assembly 20, and interference occurs, which is line-plane interference at this time. Later, when the swing angle of the centrifugal arm 301 increases with the acceleration of the rotation speed of the wire reel 10, the centrifugal bean will be automatically adjusted to a plane (that is, a plane composed of adjacent vertex angle lines) to interfere (plane-plane interference) with the brake ring assembly 20 to generate a maximum friction resistance, that is, a maximum brake buffer force. In the late-course of casting, the rotation speed of the wire reel 10 decreases slowly, the swing angle of the centrifugal arm 301 will decrease progressively with the progressive decrease of the centrifugal force. At this time, the interference between the centrifugal bean and the brake ring assembly 20 will be automatically adjusted from "plane-plane interference" to "line-plane interference", and finally is completely detached from interference. Therefore, the friction resistance between the centrifugal bean and the brake ring assembly 20 is automatically adjusted, thereby achieving a purpose of automatically adjusting the amplitude of the brake force.

In some embodiments, each centrifugal arm 301 is provided with two centrifugal beans, i.e., a first centrifugal bean 303 and a second centrifugal bean 304, wherein one end of the centrifugal arm 301 is rotatably connected to the centrifugal seat 302, the first centrifugal bean 303 and the second centrifugal bean 304 are rotatably connected to the other end and the middle part of the centrifugal arm 301 respectively through a first rotating shaft 305 and a second rotating shaft 306, and an axis of the second rotating shaft 306 is higher than an axis of the first rotating shaft 305, so that in the process of automatically adjusting the swing angle of the centrifugal arm 301 relative to the centrifugal seat 302, the first centrifugal bean 303 and the second centrifugal bean 304 may respectively in contact with an outer plane and an inner wall surface of the brake ring assembly 20. Based on the above design, the first centrifugal bean 303 located at the end of the centrifugal arm 301 is in contact with the outer plane of the brake ring assembly 20, while the second centrifugal bean 304 located at the middle part of the centrifugal arm 301 is in contact with the inner wall surface of the brake ring assembly 20. Then, when in use, one centrifugal arm 301 may be in contact with two brake surfaces (the outer plane and the inner wall surface) simultaneously and interference occurs. That is, a plurality of brake surfaces can be provided to better adjust a dynamic balance between the rotation speed of the wire reel 10 and the brake force.

Continued to FIG. 2 to FIG. 6, in some embodiments, the brake ring assembly 20 includes a brake ring 202. The brake ring 202 includes a circular ring 2021 and a secondary brake ring 2022 that extends obliquely upward from an inner ring surface of the circular ring 2021. The centrifugal arm 301 includes an arc-shaped plate 3011, an accommodating groove 3012 is formed in the middle of the arc-shaped plate 3011, and one end and the middle part of the arc-shaped plate 3011 extend upward respectively to form an arc-shaped part 3013 for the first rotating shaft 305 and the second rotating shaft 306 to pass through. The first centrifugal bean 303 and the second centrifugal bean 304 respectively sleeve the first rotating shaft 305 and the second rotating shaft 306, are located in the accommodating groove 3012, and may rotate around the first rotating shaft 305 and the second rotating shaft 306 respectively to automatically adjust a contact area between the first centrifugal bean 303 and an outer ring surface of the circular ring 2021 and a contact area between the second centrifugal bean 304 and an inner wall surface of the secondary brake ring 2022 when the wire reel 10 rotates. It can be seen that the first centrifugal bean 303 and the second centrifugal bean 304 may rotate freely at 360 degrees. The first centrifugal bean 303 and the second centrifugal bean 304 that may rotate freely at 360 degrees may automatically adjust a brake contact surface with the brake ring assembly 20 along with the swing angle of the centrifugal arm 301, thereby achieving a purpose of automatically adjusting the brake force.

Figure 6:
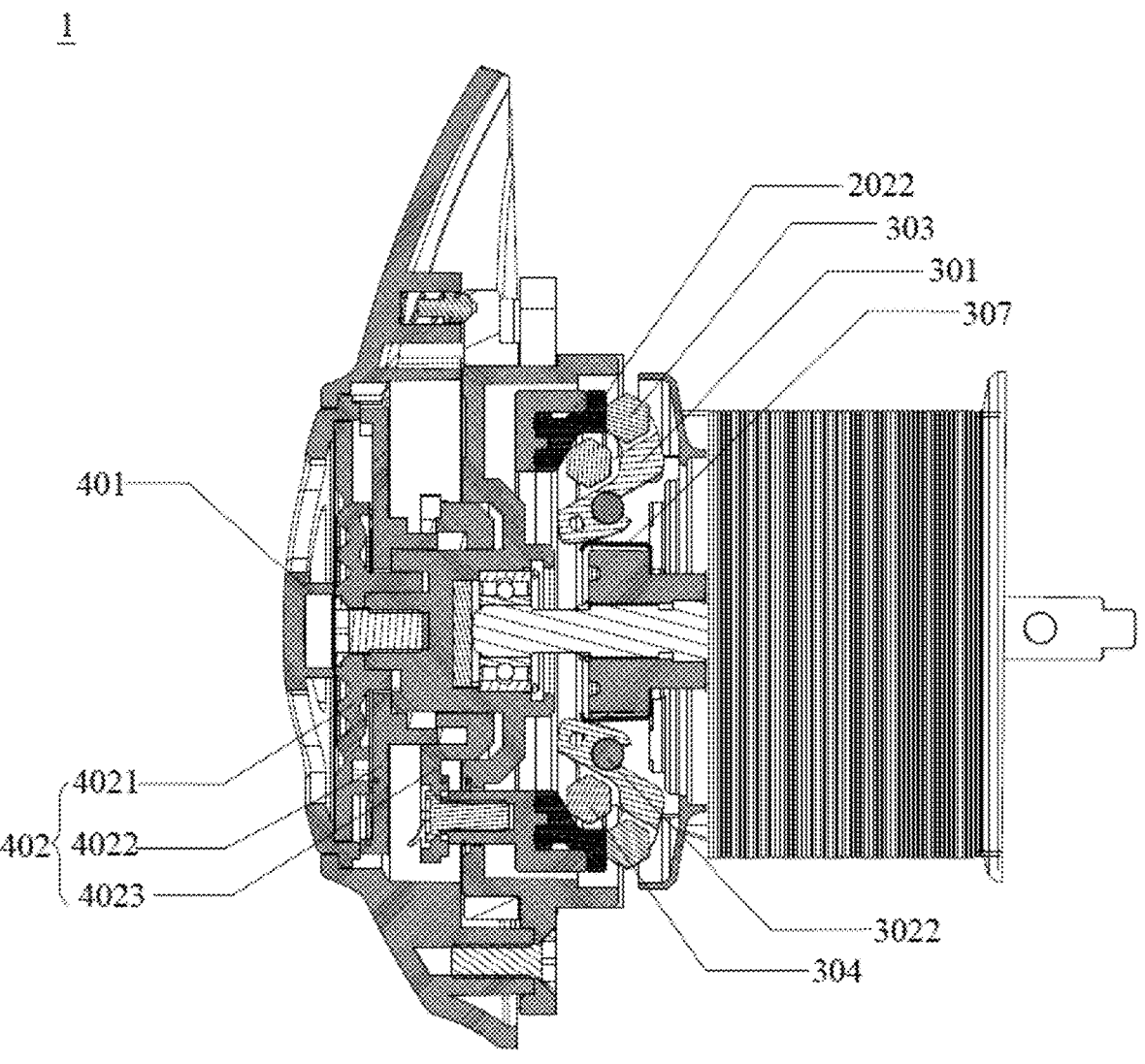
FIG. 6 is a schematic sectional view in which the centrifugal brake assembly in the first embodiment of the centrifugal brake mechanism of the present invention is in a state of a larger brake force.
Figure 7:
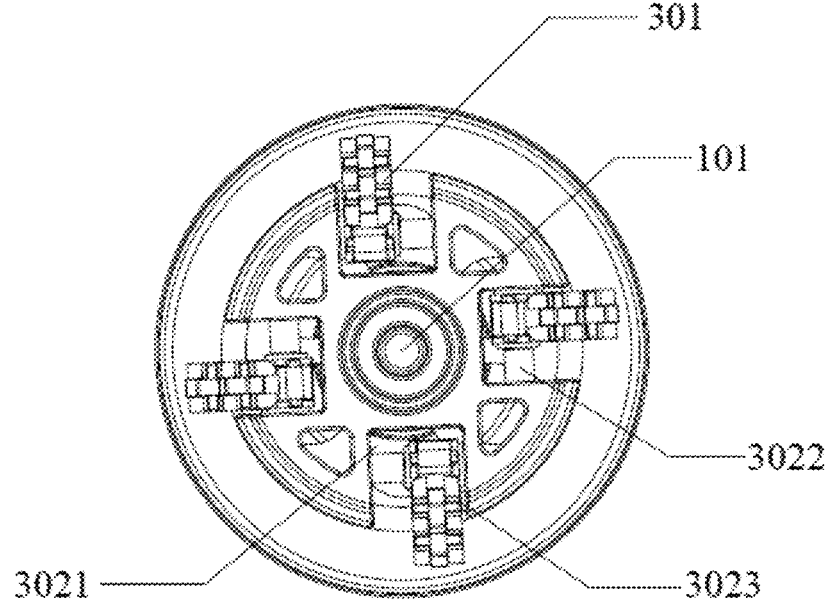
FIG. 7 is a schematic top view of in which the centrifugal brake assembly in the first embodiment of the centrifugal brake mechanism of the present invention is in a locked state.
Figure 8:
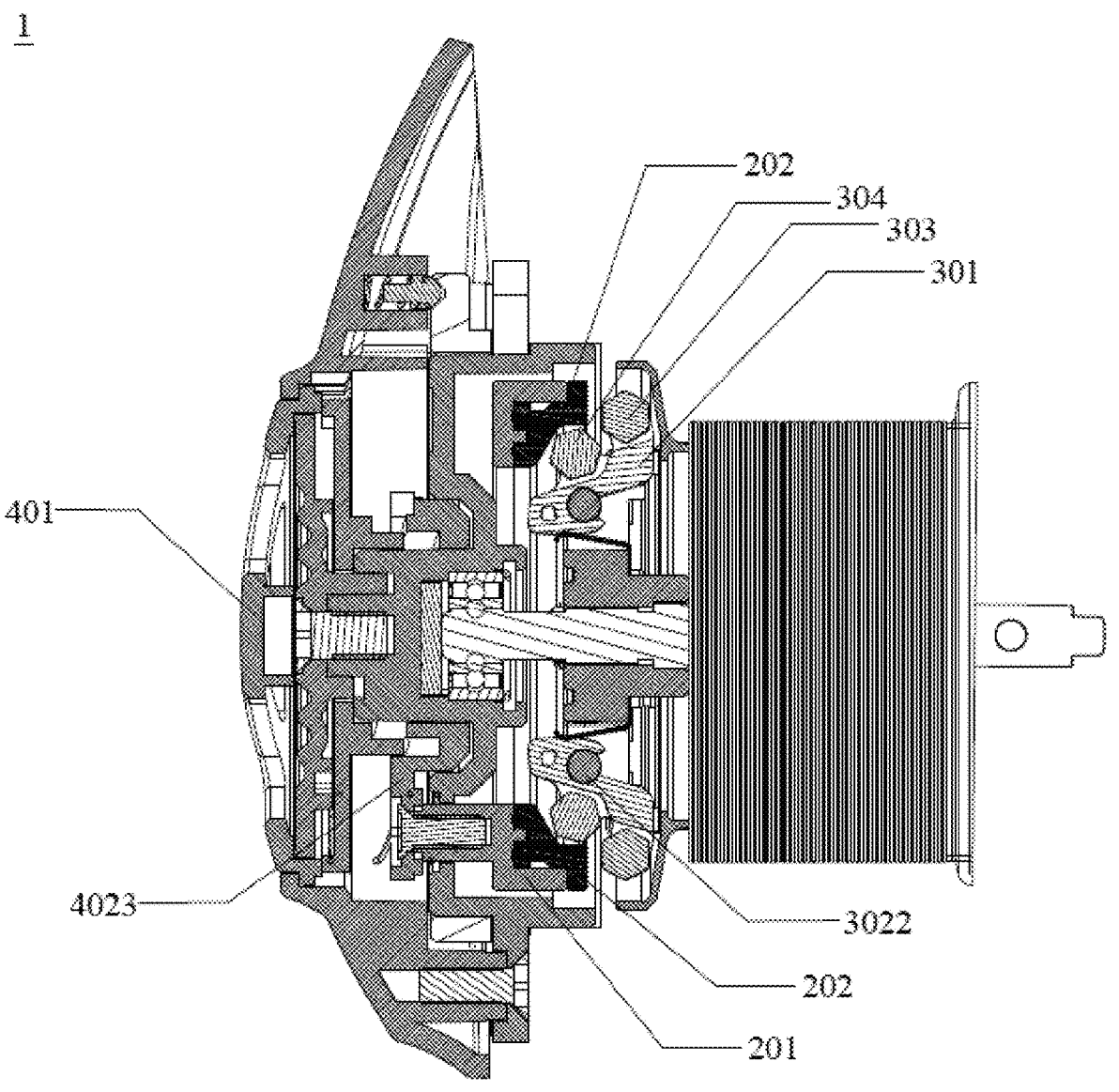
FIG. 8 is a schematic sectional view in which the centrifugal brake assembly in the first embodiment of the centrifugal brake mechanism of the present invention is in the locked state.

In this embodiment shown in the accompanying drawings, the brake ring assembly 20 further includes a brake ring seat 201. The brake ring 202 is arranged on the brake ring seat 201. The centrifugal brake mechanism 1 further includes a gear adjusting assembly 40. The gear adjusting assembly 40 includes an adjusting knob 401, and a connector 402 that is located below the adjusting knob 401 and is connected to the adjusting knob 401. The brake ring seat 201 is located between the connector 402 and the wire reel 10. The brake ring seat 201 is movably connected to the connector 402 through at least one elastic member 203 so as to move in a direction close to the wire reel 10 as the adjusting knob 401 acts, such that the first centrifugal bean 303 and the second centrifugal bean 304 may be sequentially in contact with the outer ring surface of the circular ring 2021 and the inner wall surface of the secondary brake ring 2022, respectively. In this embodiment, according to the centrifugal brake mechanism 1, when a gear of the adjusting knob 401 is adjusted from small to large in the casting process of the user, in a front-course of casting (e.g., in the first two-thirds of a stroke), the second centrifugal bean 304 assembled in the middle of the centrifugal arm 301 will not undergo interference friction with the inner wall surface of the secondary brake ring 2022 no matter how much centrifugal force is subjected to. The brake force of the centrifugal brake mechanism 1 is mainly generated by interference friction between the first centrifugal bean 303 assembled at the end of the centrifugal arm 301 and the outer plane of the circular ring 2021 under a centrifugal force. However, in the later-course of casting (after more than two-thirds of the stroke), the second centrifugal bean 304 will begin to undergo interference friction with the inner wall surface of the secondary brake ring 2022 and produce a brake force (as shown in FIG. 6), the overall brake force increases, and the brake force increases progressively with the gear increase.

In this embodiment, the connector 402 includes a rotating connector 4021, a first connector 4022 and a second connector 4023. The rotating connector 4021 abuts against the adjusting knob 401, and a plurality of groove bodies 4025 is formed in a surface of the rotating connector 4021 that abuts against the adjusting knob 401, such that the bottom of the adjusting knob 401 is inserted into the groove body 4025 as the adjusting knob 401 rotates, in order to cooperate with the groove body 4025 to drive the rotating connector 4021 to rotate. The rotating connector 4021 is connected to the first connector 4022, the middle part of the first connector 4022 extends outward to form a spiral flange 4024, and the spiral flange 4024 penetrates into the second connector 4023 and is located in the second connector 4023. The spiral flange 4024 cooperates with an inner wall of the second connector 4023 to move along a trajectory of the inner wall of the second connector 4023 when the adjusting knob 401 rotates, thereby pushing the second connector 4023 to displace axially and move in a direction close to or away from the wire reel 10. However, in this embodiment, the brake ring seat 201 is evenly distributed with three connecting posts 2011, each connecting column 2011 is sleeved with an elastic member 203, and the second connector 4023 is connected to the connecting posts 2011, so as to drive the brake ring seat 201 and the brake ring 202 located on this brake ring seat 201 to move in a direction close to or away from the wire reel 10. It may be understood that in some other embodiments, the adjusting knob 401 may be fixedly connected to the connector 402, and the connector 402 is made to move in a direction of close to/away from the wire reel 10 by pressing the adjusting knob 401.

In some embodiments, the centrifugal seat 302 is provided with at least two sliding grooves 3021, a connecting shaft 3022 is arranged in each sliding groove 3021, each centrifugal arm 301 is located in one corresponding sliding groove 3021, and an end of this centrifugal arm 301 is hooked on the connecting shaft 3022, and may rotate around the connecting shaft 3022 and swing vertically relative to the centrifugal seat 302. That is, under a centrifugal force, the end of the centrifugal arm 301 that is hooked on the connecting shaft 3022 may rotate around the connecting shaft 3022, so that the other end of the centrifugal arm 301 swings upward/downward, making the centrifugal bean contact/move away from the brake ring 202.

Specifically, in this embodiment, the number of the centrifugal arms 301 and the number of the sliding grooves 3021 are both four. The four sliding grooves 3021 are formed in the centrifugal seat 302 around a circle center of the centrifugal seat 302, the four centrifugal arms 301 are respectively hooked on connecting shafts 3022 of the four sliding grooves 3021, and each of the four connecting shafts 3022 is provided with an arc-shaped groove 3024 formed therein. A limiting part 3015 that is located in the arc-shaped groove 3024 and cooperates with the arc-shaped groove 3024 is correspondingly arranged on each of the four centrifugal arms 301, so as to limit a rotation angle of the centrifugal arm 301, wherein a radian of the arc-shaped grooves 3024 in the two opposite connecting shafts 3022 is greater than a radian of the arc-shaped grooves 3024 in the other two opposite connecting shafts 3022. It may be understood that the four centrifugal arms 301 are divided into two groups in this embodiment. Due to different radians of the arc-shaped grooves 3024 in the connecting shafts 3022 in the four sliding grooves 3021, different limiting intervals are made for the two groups of centrifugal arms 301, so that maximum swing angles of the two groups of centrifugal arms 301 under the same centrifugal force are different, and the maximum swing angle of the two centrifugal arms 301 rotatably connected to the connecting shaft 3022 in the arc-shaped groove 3024 with larger radian is larger. When the gear of the adjusting knob 401 is adjusted from small to large, the centrifugal beans on the two centrifugal arms 301 with larger maximum swing angle may first undergo interference friction with two brake surfaces of the brake ring 202 to produce a brake force, and the remaining two centrifugal arms 301 may then undergo interference friction with the two brake surfaces of the brake ring 202 to produce a brake force, thereby realizing segmented braking of the wire reel 10, and achieving a centrifugal braking effect that the centrifugal brake force is adjustable from small to large and may be perceived by an angler.

Further, in some embodiments, the centrifugal seat 302 further includes four locking rods 3023. One locking rod 3023 is arranged in each sliding groove 3021; one end of the locking rod 3023 is connected to a side wall of the sliding groove 3021, and the other end of the locking rod 3023 is close to the centrifugal arm 301; and a fixing groove 3014 is formed in a position on the centrifugal arm 301 corresponding to the locking rod 3023, so that the fixing groove 3014 of the centrifugal arm 301 cooperates with the locking rod 3023 under an external force to lock the centrifugal arm 301. Based on the above design, the centrifugal arm 301 may be locked through the cooperation of the locking rod 3023 in the sliding groove 3021 and the fixing groove 3014 in the centrifugal arm 301. That is, the centrifugal arm 301 may be made to move left and right on the connecting shaft 3022 through an external force, so that the locking rod 3023 may be clamped into the fixing groove 3014, thereby achieving a locking function. The centrifugal arm 301 may no longer rotate around the connecting shaft 3022 after being locked. Regardless of how the gear and centrifugal force of the adjusting knob 401 change, the locked centrifugal arm 301 does not participate in the implementation of the braking function. During use, the user may independently select zero to four centrifugal arms 301 to participate in the implementation of the braking function according to their own fishing habits, so as to meet the use habits of anglers who have different needs for braking effects.

Figure 3:
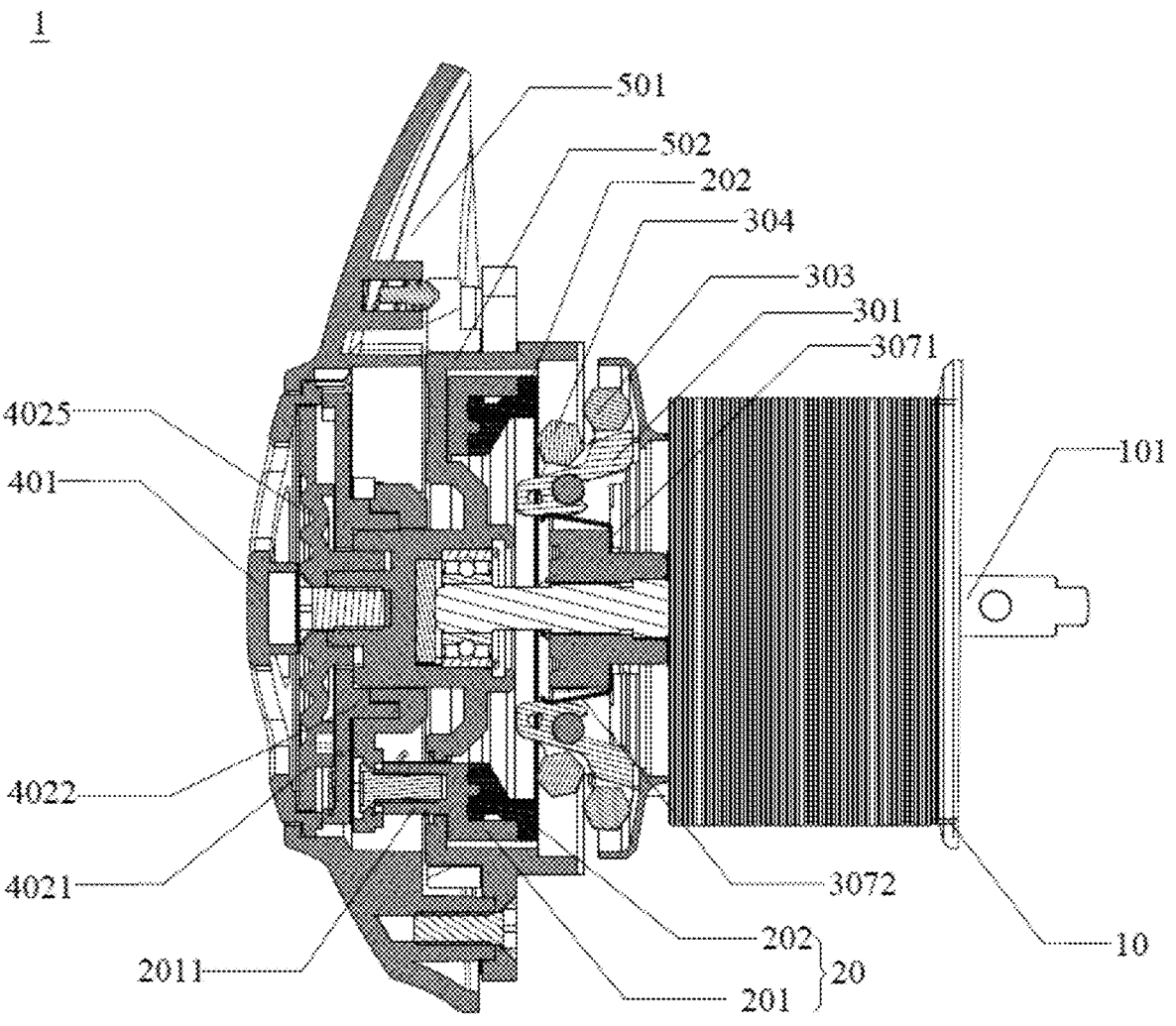
FIG. 3 is a schematic sectional view of the first embodiment of the centrifugal brake mechanism of the present invention.
Figure 4:
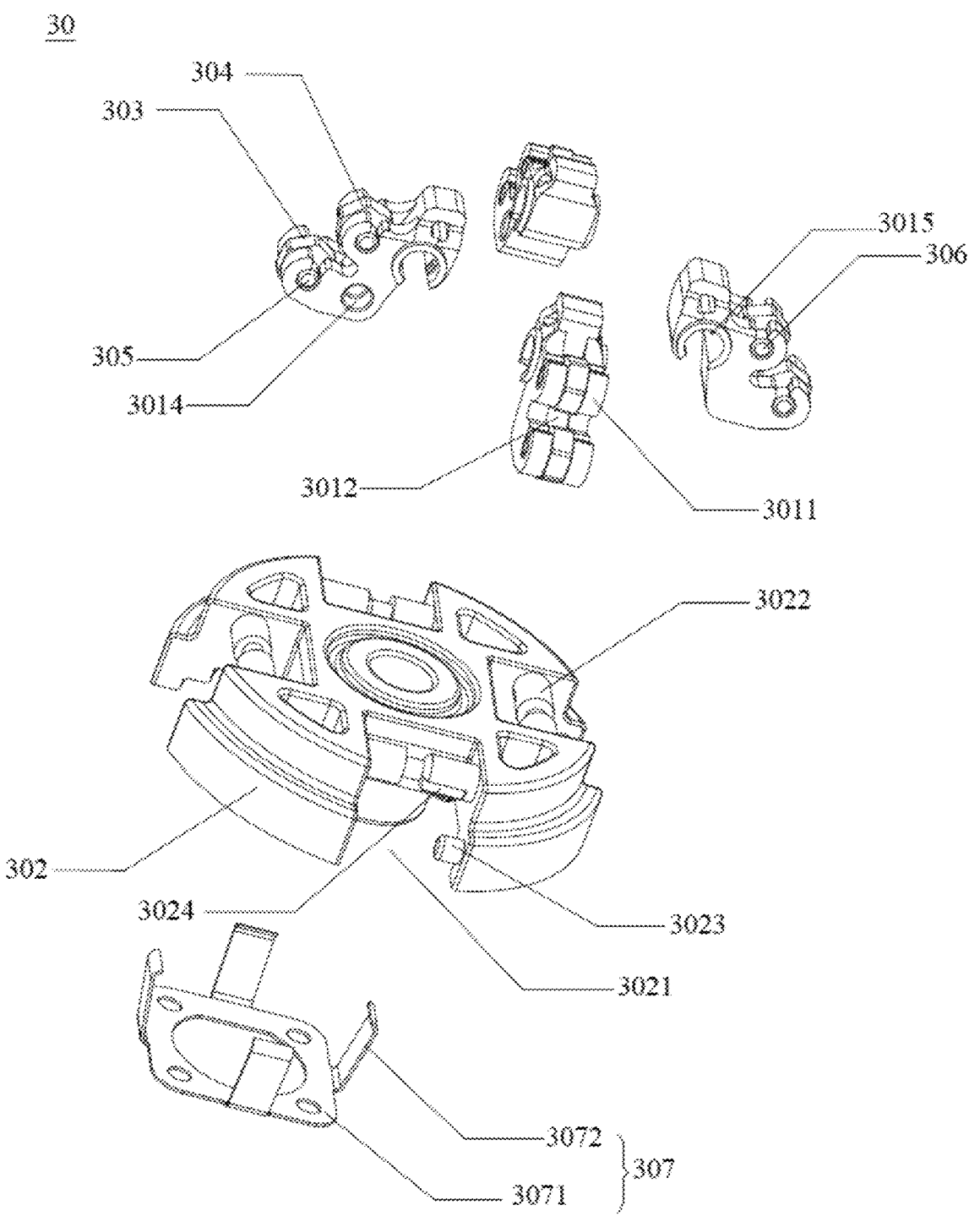
FIG. 4 is a schematic diagram of an exploded structure of a centrifugal brake assembly in the first embodiment of the centrifugal brake mechanism of the present invention.
Figure 5:
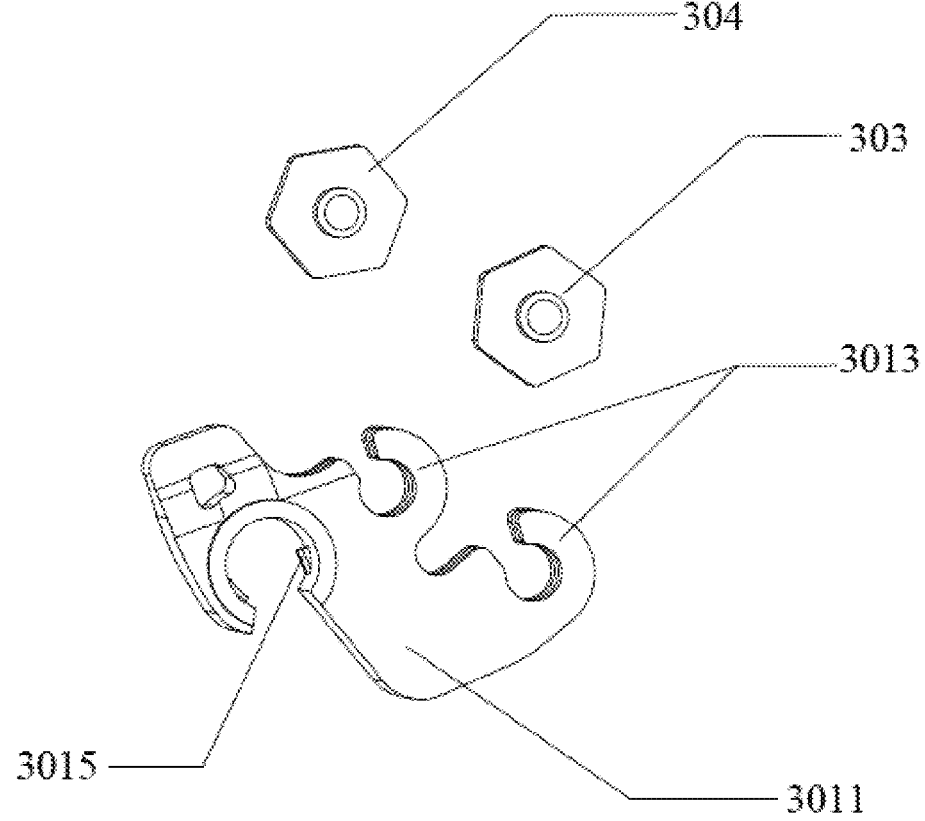
FIG. 5 is a schematic diagram of an exploded structure of a centrifugal arm in the first embodiment of the centrifugal brake mechanism of the present invention.

Continued to FIG. 3, FIG. 4 and FIG. 6, in this embodiment as shown in the accompanying drawings, the centrifugal brake assembly 30 further includes a reset spring plate 307. The reset spring plate 307 includes a bottom plate 3071 and at least two metal spring plates 3072 that extend upward from an edge of the bottom plate 3071. The bottom plate 3071 is located in the centrifugal seat 302; and each metal spring plate 3072 penetrates into one corresponding sliding groove 3021 and abuts against the centrifugal arm 301 that is located on the inner side of the connecting shaft 3022. Based on the above design, the metal spring plate 3072 abuts against the centrifugal arm 301, which may provide the centrifugal arm 301 with an elastic force opposite to the centrifugal force, such that the intervention of the brake force can be minimized in the case of a small centrifugal force. Because no interference of an external force (i.e., the brake force) is needed in general cases when a bait speed is greater than a running speed of the wire reel 10 in the casting process, the reset spring plate 307 in the present invention can minimize the loss in a bait-casting distance, so that a bait is cast into a water area of a longer distance, thereby increasing a fish hitting rate. In addition, in a non-use state, the reset spring plate 307 may also prevent the centrifugal arm 301 from rotating freely and emitting abnormal sounds.

In some embodiments, the centrifugal brake mechanism 1 further includes a side cover assembly 50. The side cover assembly 50 includes a side cover main body 501 and a wire reel seat 502 connected to the side cover main body 501. The adjusting knob 401 is arranged on the side cover main body 501 and is exposed outside the side cover main body 501. The connector 402 is located between the side cover main body 501 and the wire reel seat 502. The brake ring assembly 20 is located in the wire reel seat 502. The rotating shaft 101 of the wire reel 10 penetrates into the brake ring assembly 20 and is located in the side cover assembly 50.

It may be understood that, during initialization, as shown in FIG. 3 (a fishing wire is wound on the wire reel 10 in FIG. 3), the first centrifugal bean 303 and the second centrifugal bean 304 on the centrifugal arm 301 are kept at a set distance with the brake ring assembly 20. In a front-course of casting, the wire reel 10 rotates rapidly, and the centrifugal arm 301 swings under a centrifugal force. As the centrifugal force increases progressively (i.e., the swing angle of the centrifugal arm 301 increases progressively), the hexagonal centrifugal beans that may rotate freely at 360 degrees on the two centrifugal arms 301 that are rotatably connected to the connecting shaft 3022 in the arc-shaped groove 3024 with a larger radian will first interfere with the corresponding brake surface of the brake ring assembly 20 through lines (i.e., vertex angle lines on the hexagonal centrifugal bean). Later, when the swing angle of the centrifugal arm 301 increases with the acceleration of the rotation speed of the wire reel 10, the centrifugal bean automatically adjusts to a plane and interferes with the corresponding braking surface of the brake ring assembly 20 to produce a maximum brake force. In the above process, the centrifugal beans on the remaining two centrifugal arms 301 may also subsequently undergo interference friction with the corresponding braking surface of the brake ring assembly 20 of the brake ring 202 to generate a brake force, thereby achieving segmented braking of the wire reel 10. In addition, in the above process, brake gears may be adjusted through the adjusting knob 401, so that interference occurs between the first centrifugal bean 303 and the outer plane of the circular ring 2021 and/or between the second centrifugal bean 304 and the inner wall surface of the secondary brake ring 2022, thereby further adjusting the brake force. However, in the late-course of casting, the rotation speed of the wire reel 10 decreases slowly, the swing angle of the centrifugal arm 301 will decrease progressively with the progressive decrease of the centrifugal force. At this time, the interference between the centrifugal bean and the brake ring assembly 20 will be automatically adjusted from "plane-plane interference" to "line-plane interference", and finally is completely detached from interference. Therefore, the friction resistance between the centrifugal bean and the brake ring assembly 20 is automatically adjusted, thereby achieving a purpose of automatically adjusting the amplitude of the brake force.

Figure 9:
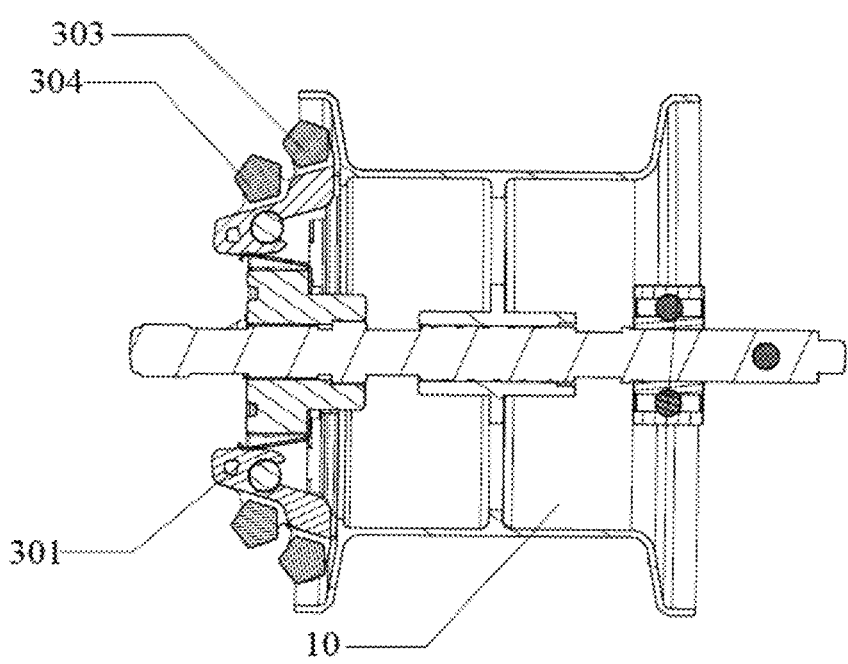
FIG. 9 is a schematic sectional view of a second embodiment of the centrifugal brake mechanism of the present invention.

Referring to FIG. 9, FIG. 9 illustrates a second embodiment of the centrifugal brake mechanism 1 of the present invention. In order to show the structure of the centrifugal beans more clearly, the side cover assembly and the brake ring assembly are removed in FIG. 9. This embodiment differs from the first embodiment in that the specific shapes of the centrifugal beans are different, and the remaining structure is unchanged. In this embodiment, the first centrifugal bean 303 and the second centrifugal bean 304 each have a pentagonal cross-section. It can be seen that the pentagonal centrifugal beans in this embodiment may also rotate freely at 360 degrees, and may automatically adjust a brake contact surface with the brake ring assembly 20 along with the swing angle of the centrifugal arm 301, thereby achieving a purpose of automatically adjusting the brake force.

Figure 10:
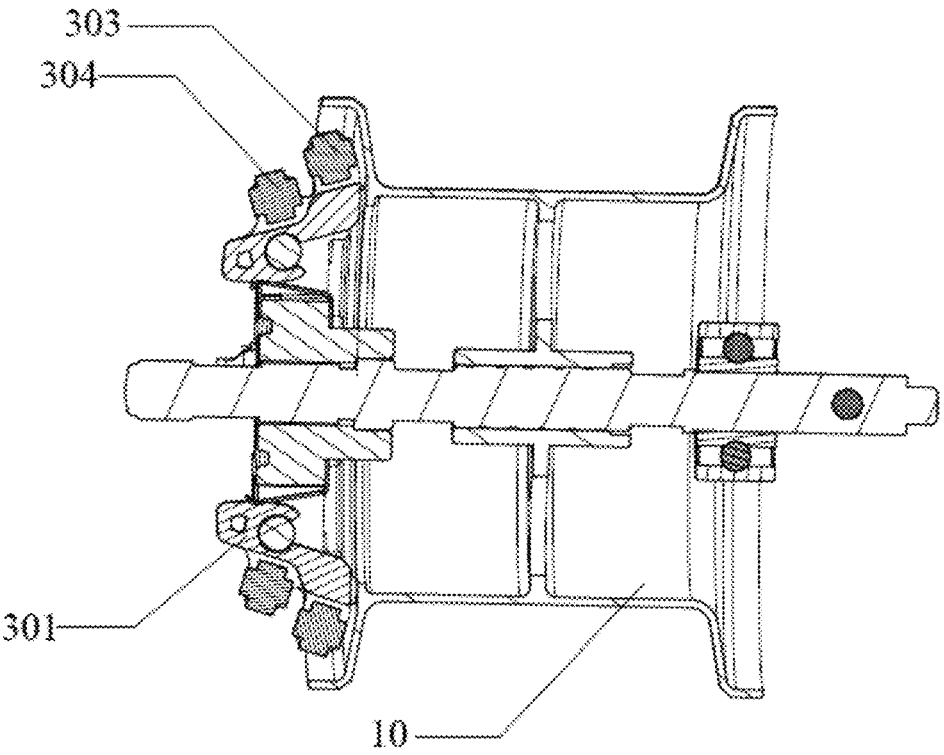
FIG. 10 is a schematic sectional view of a third embodiment of the centrifugal brake mechanism of the present invention.

Referring to FIG. 10, FIG. 10 illustrates a third embodiment of the centrifugal brake mechanism 1 of the present invention. In order to show the structure of the centrifugal beans more clearly, the side cover assembly and the brake ring assembly are removed in FIG. 10. This embodiment differs from the first embodiment in that the specific shapes of the centrifugal beans are different, and the remaining structure is unchanged. In this embodiment, the first centrifugal bean 303 and the second centrifugal bean 304 each have a cross-shaped cross-section. It can be seen that in this embodiment, the cross-shaped centrifugal bean can also realize the transformation of "line-plane interference" to "plane-plane interference" and then to "line-plane interference" between the centrifugal bean and the brake surface of the brake ring assembly 20, thereby achieving a purpose of automatically adjusting the brake force; and the first centrifugal bean 303 may interfere with the outer plane of the circular ring 2021 and/or the second centrifugal bean 304 may interfere with the inner wall surface of the secondary brake ring 2022, thereby further adjusting the brake force. It may be understood that in some other embodiments, the centrifugal bean may also have a quadrilateral cross-section.

Figure 11:
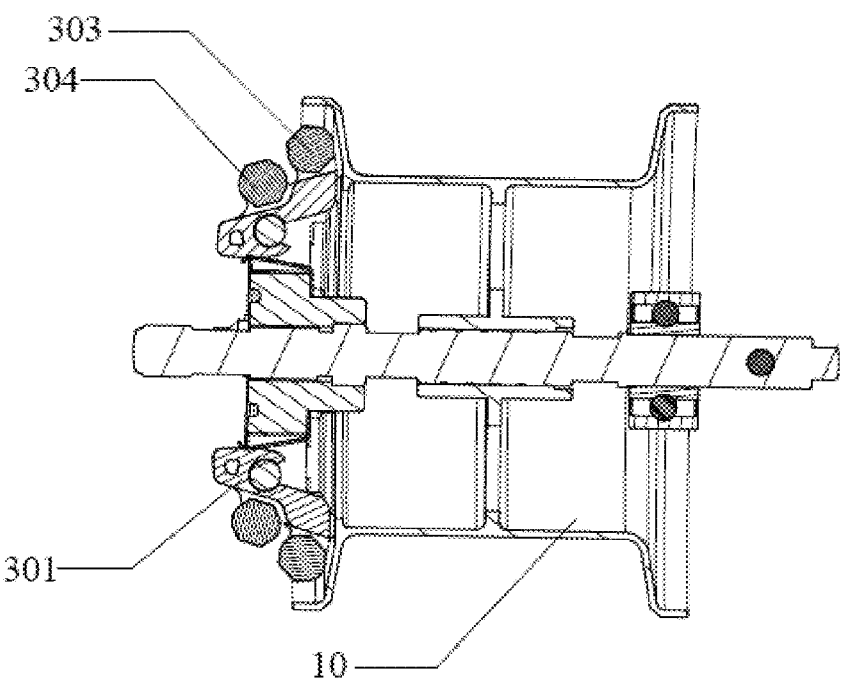
FIG. 11 is a schematic sectional view of a fourth embodiment of the centrifugal brake mechanism of the present invention.

Referring to FIG. 11, FIG. 11 illustrates a fourth embodiment of the centrifugal brake mechanism 1 of the present invention. In order to show the structure of the centrifugal beans more clearly, the side cover assembly and the brake ring assembly are removed in FIG. 11. This embodiment differs from the first embodiment in that the specific shapes of the centrifugal beans are different, and the remaining structure is unchanged. In this embodiment, the first centrifugal bean 303 and the second centrifugal bean 304 each have a polygonal rhomboidal (roughly lantern-shaped) cross-section. This embodiment can also achieve the purpose of automatically adjusting the brake force.

Figure 12:
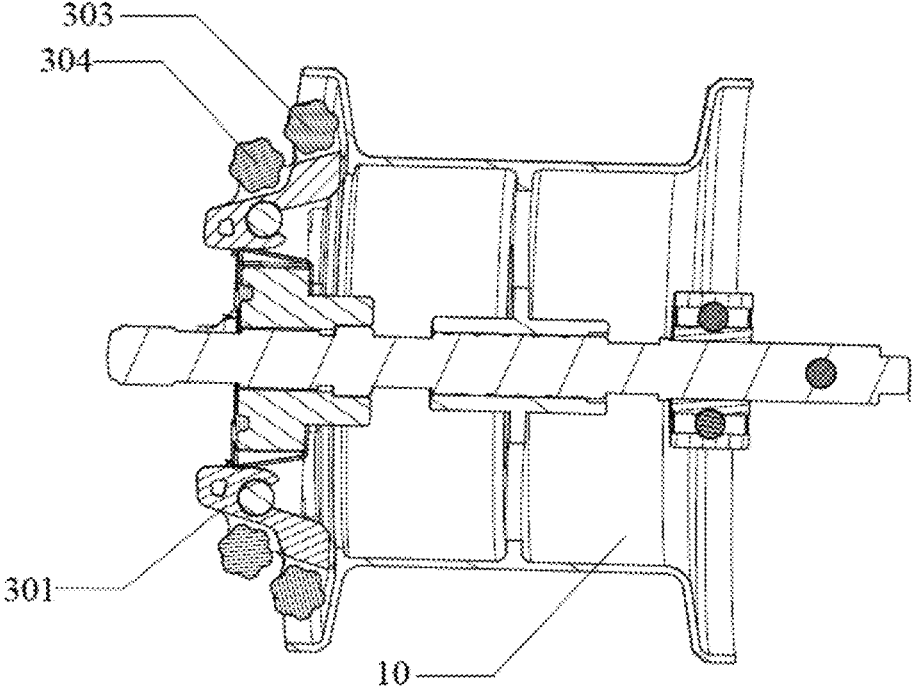
FIG. 12 is a schematic sectional view of a fifth embodiment of the centrifugal brake mechanism of the present invention.

Referring to FIG. 12, FIG. 12 illustrates a fifth embodiment of the centrifugal brake mechanism 1 of the present invention. In order to show the structure of the centrifugal beans more clearly, the side cover assembly and the brake ring assembly are removed in FIG. 12. This embodiment differs from the first embodiment in that the specific shapes of the centrifugal beans are different, and the remaining structure is unchanged. In this embodiment, the first centrifugal bean 303 and the second centrifugal bean 304 each have a polygonal quincuncial cross-section. It can be seen that the polygonal quincuncial centrifugal beans in this embodiment may also rotate freely at 360 degrees, and may automatically adjust a brake contact surface with the brake ring assembly 20 along with the swing angle of the centrifugal arm 301, thereby achieving a purpose of automatically adjusting the brake force. It may be understood that in some other embodiments, the shapes of the first centrifugal bean 303 and the second centrifugal bean 304 may be different. That is, the cross-section of the first centrifugal bean 303 may be quincuncial, while the cross-section of the second centrifugal bean 304 may be pentagonal, hexagonal, polygonal rhomboidal or other polygons.

Figure 13:
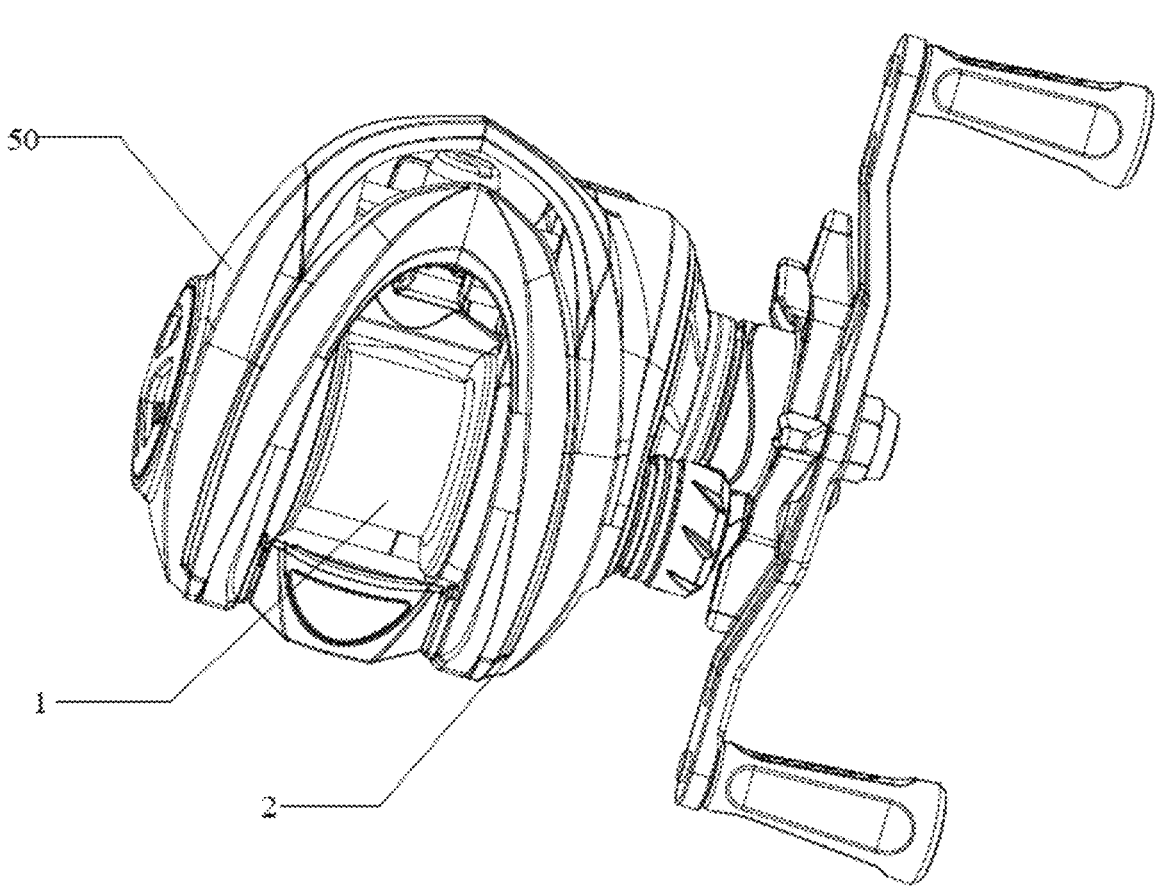
FIG. 13 is a schematic structural diagram of a specific embodiment of a bait-casting reel of the present invention.

Referring to FIG. 13, FIG. 13 is a schematic structural diagram of a specific embodiment of a bait-casting reel of the present invention. In this embodiment as shown in FIG. 13, the bait-casting reel 100 includes a fishing reel main body 2 and the centrifugal brake mechanism 1 according to the first embodiment, wherein the wire reel 10 and the centrifugal brake assembly 20 in the centrifugal brake mechanism 1 may be assembled in the fishing reel main body 2, and the side cover assembly 50 is connected to the fishing reel main body 2. It may be understood that in some other embodiments, the centrifugal brake mechanism 1 may be the centrifugal brake mechanism according to the second embodiment/third embodiment/fourth embodiment/fifth embodiment.

In conjunction with FIG. 3 and FIG. 6, during initialization, as shown in FIG. 3, the first centrifugal bean 303 and the second centrifugal bean 304 on the centrifugal arm 301 in the centrifugal brake mechanism 1 of the present invention are kept at a set distance with the brake ring assembly 20. In a front-course of casting, the wire reel 10 rotates rapidly, and the centrifugal arm 301 swings under a centrifugal force. The hexagonal centrifugal bean that may rotate freely at 360 degrees on the centrifugal arm 301 will first interfere with the corresponding brake surface of the brake ring assembly 20 through lines (i.e., vertex angle lines on the hexagonal centrifugal bean). Later, when the swing angle of the centrifugal arm 301 increases with the acceleration of the rotation speed of the wire reel 10, the centrifugal bean automatically adjusts to a plane and interferes with the corresponding braking surface of the brake ring assembly 20 to produce a maximum brake force (as shown in FIG. 6). Therefore, the rotation speed of the wire reel 10 is automatically fine-tuned to maintain a dynamic balance with the brake force, so that the phenomenon of fishing wire entangling caused by too fast rotation of the wire reel 10 can be effectively prevented.

Meanwhile, the present invention may further provide a fishing tackle including the above bait-casting reel 100. The fishing tackle may have the same structure as the common fishing tackle in the prior art except the bait-casting reel 100. For example, a fishing rod, a fishing wire, etc., may be provided, and their structures are well known to those skilled in the art, which will not be repeated herein.

The foregoing is only preferred embodiments of the present invention and is not intended to limit the present invention in any form. Those skilled in the art may apply various equivalent changes and improvements on the basis of the above embodiments, and any equivalent changes or modifications made within the scope of the claims shall fall within the protection scope of the present invention.

What is claimed is:

1. A centrifugal brake mechanism, comprising:
a wire reel;
a brake ring assembly, arranged on one side of the wire reel; and
a centrifugal brake assembly, comprising a centrifugal seat connected to the wire reel and at least two centrifugal arms, wherein the centrifugal arm is rotatably connected to the centrifugal seat and is capable of swinging vertically relative to the centrifugal seat; and at least one centrifugal bean having a polygonal cross-section is rotatably connected to the centrifugal arm, so that a swing angle of the centrifugal arm relative to the centrifugal seat is automatically adjusted according to the rotation speed of the wire reel, thereby adjusting a contact area between the centrifugal bean and the brake ring assembly.

2. The centrifugal brake mechanism according to claim 1, wherein each centrifugal arm is provided with a first centrifugal bean and a second centrifugal bean, one end of the centrifugal arm is rotatably connected to the centrifugal seat, the first centrifugal bean and the second centrifugal bean are rotatably connected to the other end and a middle part of the centrifugal arm respectively through a first rotating shaft and a second rotating shaft, and an axis of the second rotating shaft is higher than an axis of the first rotating shaft, so that in the process of automatically adjusting the swing angle of the centrifugal arm relative to the centrifugal seat, the first centrifugal bean and the second centrifugal bean are respectively in contact with an outer plane and an inner wall surface of the brake ring assembly.

3. The centrifugal brake mechanism according to claim 2, wherein the brake ring assembly comprises a brake ring; the brake ring comprises a circular ring and a secondary brake ring that extends obliquely upward from an inner ring surface of the circular ring; the centrifugal arm comprises an arc-shaped plate, an accommodating groove is formed in a middle of the arc-shaped plate, and one end and a middle part of the arc-shaped plate extend upward respectively to form an arc-shaped part for the first rotating shaft and the second rotating shaft to pass through; and the first centrifugal bean and the second centrifugal bean respectively sleeve the first rotating shaft and the second rotating shaft, are located in the accommodating groove, and rotate around the first rotating shaft and the second rotating shaft respectively to automatically adjust a contact area between the first centrifugal bean and an outer ring surface of the circular ring and a contact area between the second centrifugal bean and an inner wall surface of the secondary brake ring when the wire reel rotates.

4. The centrifugal brake mechanism according to claim 3, wherein the brake ring assembly further comprises a brake ring seat; the brake ring is arranged on the brake ring seat; the centrifugal brake mechanism further comprises a gear adjusting assembly; the gear adjusting assembly comprises an adjusting knob, and a connector that is located below the adjusting knob and is connected to the adjusting knob; the brake ring seat is located between the connector and the wire reel; and the brake ring seat is movably connected to the connector through at least one elastic member so as to move in a direction close to the wire reel as the adjusting knob acts, such that the first centrifugal bean and the second centrifugal bean are sequentially in contact with the outer ring surface of the circular ring and the inner wall surface of the secondary brake ring, respectively.

5. A bait-casting reel, comprising a fishing reel main body and a centrifugal brake mechanism connected to the fishing reel main body, wherein the centrifugal brake mechanism is the centrifugal brake mechanism according to claim 4.

6. A bait-casting reel, comprising a fishing reel main body and a centrifugal brake mechanism connected to the fishing reel main body, wherein the centrifugal brake mechanism is the centrifugal brake mechanism according to claim 2.

7. A bait-casting reel, comprising a fishing reel main body and a centrifugal brake mechanism connected to the fishing reel main body, wherein the centrifugal brake mechanism is the centrifugal brake mechanism according to claim 3.

8. The centrifugal brake mechanism according to claim 1, wherein the centrifugal seat is provided with at least two sliding grooves, a connecting shaft is arranged in each sliding groove, each centrifugal arm is located in one corresponding sliding groove, and an end of the centrifugal arm is hooked on the connecting shaft, and rotates around the connecting shaft and swings vertically relative to the centrifugal seat.

9. The centrifugal brake mechanism according to claim 8, wherein the centrifugal seat further comprises at least one locking rod; one locking rod is arranged in each sliding groove; one end of the locking rod is connected to a side wall of the sliding groove, and the other end of the locking rod is close to the centrifugal arm; and a fixing groove is formed in a position on the centrifugal arm corresponding to the locking rod, so that the fixing groove of the centrifugal arm cooperates with the locking rod under an external force to lock the centrifugal arm.

10. A bait-casting reel, comprising a fishing reel main body and a centrifugal brake mechanism connected to the fishing reel main body, wherein the centrifugal brake mechanism is the centrifugal brake mechanism according to claim 9.

11. The centrifugal brake mechanism according to claim 8, wherein the centrifugal brake assembly further comprises a reset spring plate; the reset spring plate comprises a bottom plate and at least two metal spring plates that extend upward from an edge of the bottom plate; the bottom plate is located in the centrifugal seat; and each metal spring plate penetrates into one corresponding sliding groove and abuts against the centrifugal arm that is located on the inner side of the connecting shaft.

12. A bait-casting reel, comprising a fishing reel main body and a centrifugal brake mechanism connected to the fishing reel main body, wherein the centrifugal brake mechanism is the centrifugal brake mechanism according to claim 11.

13. The centrifugal brake mechanism according to claim 8, wherein the number of the centrifugal arms and the number of the sliding grooves are both four; the four sliding grooves are formed in the centrifugal seat around a circle center of the centrifugal seat, the four centrifugal arms are respectively hooked on connecting shafts of the four sliding grooves, each of the four connecting shafts is provided with an arc-shaped groove formed therein; and a limiting part that cooperates with the arc-shaped groove is correspondingly arranged on each of the four centrifugal arms, so as to limit a rotation angle of the centrifugal arm, wherein a radian of the arc-shaped grooves in the two opposite connecting shafts is greater than a radian of the arc-shaped grooves in the other two opposite connecting shafts.

14. A bait-casting reel, comprising a fishing reel main body and a centrifugal brake mechanism connected to the fishing reel main body, wherein the centrifugal brake mechanism is the centrifugal brake mechanism according to claim 13.

15. A bait-casting reel, comprising a fishing reel main body and a centrifugal brake mechanism connected to the fishing reel main body, wherein the centrifugal brake mechanism is the centrifugal brake mechanism according to claim 8.

16. The centrifugal brake mechanism according to claim 1, wherein a cross-section of each centrifugal bean is hexagonal, pentagonal, cross-shaped, quadrilateral, polygonal rhomboidal or polygonal quincuncial.

17. A bait-casting reel, comprising a fishing reel main body and a centrifugal brake mechanism connected to the fishing reel main body, wherein the centrifugal brake mechanism is the centrifugal brake mechanism according to claim 16.

18. The centrifugal brake mechanism according to claim 1, wherein the centrifugal brake mechanism further comprises a side cover assembly; the brake ring assembly is arranged in the side cover assembly; and a rotating shaft of the wire reel penetrates into the brake ring assembly and is placed in the side cover assembly.

19. A bait-casting reel, comprising a fishing reel main body and a centrifugal brake mechanism connected to the fishing reel main body, wherein the centrifugal brake mechanism is the centrifugal brake mechanism according to claim 1.

20. A fishing tackle, comprising the bait-casting reel according to claim 19.

\* \* \* \* \*